(12) United States Patent
Wei et al.

(10) Patent No.: US 7,952,282 B2
(45) Date of Patent: May 31, 2011

(54) BRAZING ALLOY AND CERAMIC DISCHARGE LAMP EMPLOYING SAME

(75) Inventors: George C. Wei, Weston, MA (US); Yi Zheng, Lynnfield, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 498 days.

(21) Appl. No.: 12/111,464

(22) Filed: Apr. 29, 2008

(65) Prior Publication Data
US 2009/0269523 A1    Oct. 29, 2009

(51) Int. Cl.
*H01J 5/32*     (2006.01)
*H01J 17/18*    (2006.01)

(52) U.S. Cl. ............. 313/623; 313/625; 420/52; 420/64

(58) Field of Classification Search .......... 313/623, 313/625–626, 639; 420/52, 64, 17
See application file for complete search history.

(56) References Cited

U.S. PATENT DOCUMENTS

| | | |
|---|---|---|
| 3,150,446 A | 9/1964 | Todd |
| 4,076,991 A | 2/1978 | Datta |
| 5,075,587 A | 12/1991 | Pabst et al. |
| 5,326,623 A | 7/1994 | Yamakawa et al. |
| 5,810,635 A | 9/1998 | Heider et al. |
| 6,475,924 B2 | 11/2002 | Yamamoto et al. |
| 6,733,822 B2 | 5/2004 | Yamamoto et al. |
| 6,762,496 B2 | 7/2004 | Yamamoto et al. |
| 2005/0070421 A1 | 3/2005 | Kanechika et al. |
| 2005/0082983 A1 | 4/2005 | Apetz et al. |
| 2005/0184632 A1 | 8/2005 | Galvez et al. |
| 2005/0258759 A1 | 11/2005 | Wei |
| 2006/0279218 A1 | 12/2006 | Uemura et al. |
| 2007/0215586 A1* | 9/2007 | Graillat et al. ........ 219/137 WM |
| 2009/0174303 A1 | 7/2009 | Kanechika et al. |

FOREIGN PATENT DOCUMENTS

| | | |
|---|---|---|
| EP | 0587238 | 3/1994 |
| WO | WO 03/060952 | 7/2003 |
| WO | WO2005038858 | 4/2005 |
| WO | WO 2007-069719 | 6/2007 |

OTHER PUBLICATIONS

Abstract WO 2007-069719.
Ikawa et al., Transient Liquid Phase (T.L.P.) Diffusion Bonding of Nickel-Base Heat Resisting Alloys, Transactions of the Japan Welding Society, vol. 8, No. 1 (1977) 3-8.
Gale et al., Microstructure and Mechanical Properties of Titanium Aluminide Wide-Gap, Transient Liquid-Phase Bonds Prepared using a Slurry-Deposited Composite Interlayer, Metallurgical and Materials Transactions A, vol. 33A (2002) 3205-3214.
U.S. Appl. No. 60/973,196, filed Sep. 18, 2007.

* cited by examiner

*Primary Examiner* — Karabi Guharay
(74) *Attorney, Agent, or Firm* — Robert F. Clark

(57) ABSTRACT

There is described a brazing alloy having a first component comprising a source of molybdenum and a source of aluminum and a second component comprising boron, wherein a weight ratio of said second component to said first component is not greater than 1:20. The addition of boron results a substantially lower melting point than alloys employing molybdenum and aluminum alone. It is suitable for use in discharge vessels having a hollow bodies selected from the group of monocrystalline alumina, polycrystalline alumina and aluminum nitride; metallic electrode holders fitted into ends of the hollow body; and sealed thereto by a braze.

10 Claims, 1 Drawing Sheet

BRAZING ALLOY AND CERAMIC DISCHARGE LAMP EMPLOYING SAME

TECHNICAL FIELD

This application relates to brazing alloys and more particularly to brazing alloys for sealing metallic inserts into ceramic discharge vessels.

BACKGROUND ART

The manufacture of high intensity discharge lamps, for example, metal halide lamps and high-pressure sodium lamps, involves the frit sealing of metal leads to the ceramic envelopes. For high-pressure sodium lamps, a glass-ceramic system of $Al_2O_3$—CaO—BaO—MgO—$B_2O_3$ has been employed to effect the seal between the metal lead, usually niobium, and the ceramic envelope, usually polycrystalline alumina (PCA). In metal halide lamps, because the halide fill will attack niobium, it has been customary to lower the niobium-to-PCA seal temperature to a level where the kinetics is sufficiently slow to allow reasonable life and further, to use a halide-resistant frit seal of $Dy_2O_3$—$Al_2O_3$—$SiO_2$ frit plus a molybdenum-welded-to-niobium lead structure.

While all of these solutions have provided some benefit, it would be an advance in the art to provide an improved brazing alloy.

DISCLOSURE OF INVENTION

It is, therefore, on object of this invention to obviate the disadvantages of the prior art.

It is another object of the invention to improve brazing alloys.

It is another object of the invention to enhance ceramic discharge vessels.

These objects are accomplished, in one aspect of the invention, by a brazing alloy having a first component comprising a source of molybdenum and a source of aluminum, and a second component comprising boron, wherein a weight ratio of the second component to the first component is not greater than 1:20.

The objects are accomplished in another aspect of the invention by the provision of an discharge vessel comprising: a hollow body comprised of a ceramic material selected from the group of monocrystalline alumina, polycrystalline alumina and aluminum nitride; a metallic electrode holder fitted into an end of the hollow body; and a brazing alloy sealing the metallic electrode holder to the hollow body, the brazing alloy having a first component comprising a source of molybdenum and a source of aluminum, and a second component comprising boron, wherein a weight ratio of the second component to the first component is not greater than 1:20.

The inclusion of boron into previously known brazes comprised of molybdenum and aluminum greatly increases the ductility of those compounds while significantly lowering the brazing temperature, making these compounds very suitable for use with ceramic discharge lamp envelopes.

DETAILED DESCRIPTION THE INVENTION

For a better understanding of the present invention, together with other and further objects, advantages and capabilities thereof, reference is made to the following disclosure and appended claims taken in conjunction with the above-described drawings.

Figure 1:
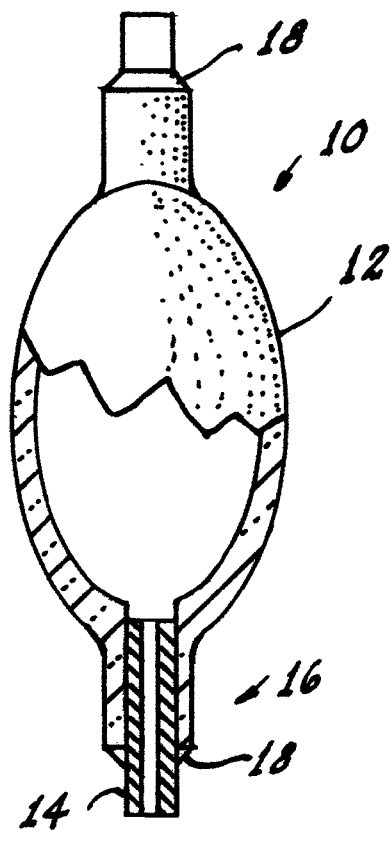
FIG. 1 is an elevation view, partially in section, of an embodiment of the invention.

Referring now to the drawings with greater particularity, there is shown in FIG. 1 a discharge vessel 10 comprising a hollow body 12 preferably comprised of a ceramic material selected from the group of monocrystalline alumina, polycrystalline alumina, and aluminum nitride. Other ceramic materials may include aluminum oxynitride, yttrium aluminate garnet, and dysprosium oxide. A tubular metallic electrode holder 14 is fitted into an end 16 of the hollow body 12. The metallic electrode holder 14 is selected from molybdenum, tungsten, niobium, or alloys thereof, as may be appropriate, in terms of thermal expansion match, for the particular discharge lamp being constructed. A brazing alloy 18 seals the metallic electrode holder 14 to the hollow body 12. The brazing alloy comprises a first component comprising a source of molybdenum and a source of aluminum, and a second component comprising boron, wherein a weight ratio of the second component to the first component is not greater than 1:20.

The sources of the molybdenum and aluminum can be the metallic elements themselves or alloys or compounds thereof, such as $Mo_3Al$; and AlN. In all examples herein, the boron was added in elemental form.

Figure 2:
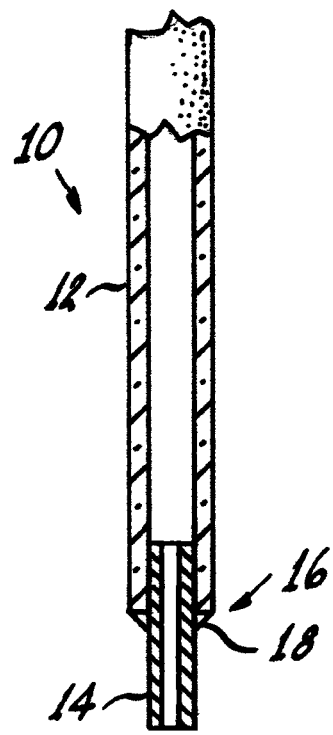
FIG. 2 is a similar view of an alternate embodiment of the invention.

The hollow body 12 can be ellipsoidal, as is now the case for some metal halide lamps, or tubular, as shown in FIG. 2 and as usually employed for high-pressure sodium lamps. In the embodiments shown in FIGS. 3 and 4, the electrode holder 14 is a rod instead of a tube and an electrode 20 is welded to an end of electrode holder 14.

As noted above, brazes of molybdenum and aluminum alone have higher melting or softening points. For example, a Mo/Al braze having a 1:1 atomic ratio of Mo to Al requires heating to a temperature of $\geq 1850°$ C. to begin softening or melting, which can be excessive for the lamps described herein. However, the same braze with 1 wt % boron added will exhibit melting at temperatures as low as 1600° C., some 250° C. lower than the braze formed of molybdenum and aluminum alone.

In a preferred embodiment of the invention the brazing composition was formed of molybdenum and aluminum nitride in an 80:20 weight ratio with an addition of 2 wt % boron. For purposes of clarity, the weight percentage of boron as used herein is based on the total weight of the molybdenum and aluminum sources. Preferably, the amount of boron is not greater than 5 weight percent (wt %).

However, other workable compositions included (1) [a mixture of 90 wt % $Mo_3Al$ powder+10 wt % of a mixture of Mo and Al metal powders in a 3:1 Mo:Al atomic ratio]+0.1 wt % B; (2) a mixture of Mo and Al metal powders in a 3:1 Mo:Al atomic ratio+2 wt % B; (3) a mixture of Mo and AlN powders in an 80:20 Mo:AlN weight ratio+2 wt % B: (4) [a mixture of 50 wt % $Mo_3Al$ powder+50 wt % a mixture of Mo and Al metal powders in a 3:1 Mo:Al atomic ratio]+2 wt % B).

The brazing temperatures ranged from 1700 to 2050° C. in vacuum or argon. A tungsten-element, Mo-shielded furnace was used for all tests. The preferred embodiment yielded a strong, dense braze while a prior art braze of Mo:Al in an atomic ratio of 61.5:38.5 yielded a porous braze. The boron containing brazes wetted both aluminum oxide or aluminum nitride and molybdenum.

The brazing alloys are preferably formulated by mixing pre-determined weights of powders of sources of molybdenum, aluminum and boron in high density polyethylene bottles containing methanol with alumina balls and rolling for one hour.

To enhance the flow of the brazing compound during application to the parts, a vehicle (up to about 12%) comprised of terpineol and ethyl cellulose can be advantageously employed.

Microstructures of brazes after sealing appear to show eutectic structures of $Mo_3Al$ and $Al_8Mo_3$. Boron was detected but appeared to have dissolved in the Mo—Al alloys as no discrete boron-containing phases were identified.

Figure 3:
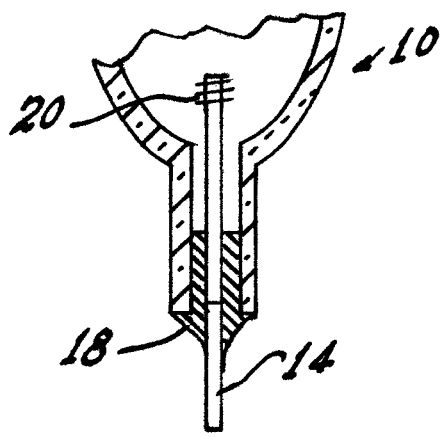
FIG. 3 is a similar view of yet another alternate embodiment of the invention.
Figure 4:
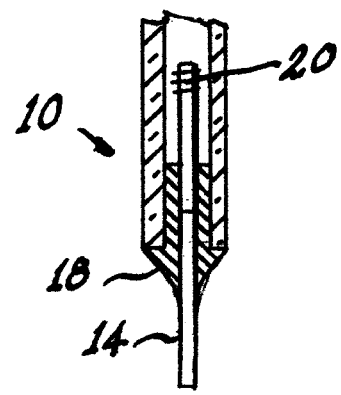
FIG. 4 is a similar view of still another embodiment of the invention.

The brazing compound of the instant invention provides significantly lower brazing temperatures and improved bonding. With respect to the previously employed glass-frit sealing, increased flexibility is provided for the end structures of the ceramic metal halide lamps since the glass-frit is limited to temperatures below 800° C. for rare earth halide fills. It removes the constraint of the limit in the upper temperature of frit seals. It allows better durability of lamps and offers the possibility of new and more aggressive fills at even higher temperatures than current PCA lamps. Further, it is applicable to many types of lamp construction, as shown by FIG. 2-4.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. A brazing alloy consisting of:
    a first component comprising a source of molybdenum and a source of aluminum; and
    a second component comprising boron, wherein a weight ratio of said second component to said first component is not greater than 1:20.

2. The brazing alloy of claim 1 wherein said source of molybdenum is molybdenum metal, said source of aluminum is aluminum metal, said molybdenum and said aluminum being present in a 1:1 atomic ratio and said boron comprises 1 wt % of the total weight of said molybdenum and said aluminum.

3. The brazing alloy of claim 1 wherein said source of molybdenum is molybdenum metal and said source of aluminum is aluminum nitride, wherein said molybdenum and said aluminum nitride are present in an 80:20 weight ratio and said boron comprises 2 wt % of the total weight of said molybdenum and said aluminum nitride.

4. The brazing alloy of claim 1 wherein said source of molybdenum is molybdenum metal, said source of aluminum is aluminum metal, said molybdenum and said aluminum being present in a 3:1 atomic ratio, and said boron being present in an amount of 2 wt % of the total weight of said molybdenum and said aluminum.

5. A brazing alloy comprising:
    a first component of 90 wt % $Mo_3Al$ and 10 wt % of a mixture of molybdenum metal and aluminum metal in a 3:1 atomic ratio; and
    a second component of boron, wherein said second component is present in an amount equal to 0.1 weight percent of said first component.

6. A brazing alloy comprising:
    a first component of 50 wt % $Mo_3Al$ and 50wt % of a mixture of molybdenum metal and aluminum metal in a 3:1 atomic ratio; and
    a second component of boron, wherein said second component is present in an amount equal to 2 weight percent of said first component.

7. An discharge vessel comprising:
    a hollow body selected from the group of monocrystalline alumina, polycrystalline alumina and aluminum nitride;
    a metallic electrode holder fitted into an end of said hollow body; and
    a brazing alloy sealing said electrode holder to said hollow body, said brazing alloy consisting of a first component comprising a source of molybdenum and a source of aluminum and a second component comprising boron, wherein a weight ratio of said second component to said first component is not greater than 1:20.

8. The discharge vessel of claim 7 wherein said hollow body is ellipsoidal and said metallic electrode holder is molybdenum.

9. The discharge vessel of claim 8 wherein said hollow body is tubular and comprised of aluminum nitride and said electrode holder is selected from the group of molybdenum and tungsten.

10. The discharge vessel of claim 8 wherein said hollow body is tubular and comprised of polycrystalline alumina and said metallic electrode holder is niobium.

* * * * *